United States Patent

[11] 3,631,240

| [72] | Inventor | Walter Hoppe |
| | | Schillerstrasse 46, 8000 Munich 15, Germany |
| [21] | Appl. No. | 831,646 |
| [22] | Filed | June 9, 1969 |
| [45] | Patented | Dec. 28, 1971 |
| [32] | Priorities | June 27, 1968 |
| [33] | | Germany |
| [31] | | P 17 72 741.2; |
| | | June 27, 1968, Germany, No. P 17 72 743.4 |

[54] APPARATUS FOR HOLDING AND ORIENTING A CRYSTAL IN X-RAY INSTRUMENTS MEASURING THE MICROSTRUCTURE THEREOF
6 Claims, 11 Drawing Figs.

| [52] | U.S. Cl. | 250/51.5 |
| [51] | Int. Cl. | G01n 23/20 |
| [50] | Field of Search | 250/51.5, 49.5 (8) |

[56] References Cited
UNITED STATES PATENTS

| 3,189,741 | 6/1965 | Patser | 250/51.5 |
| 3,345,613 | 10/1967 | Bucholtz et al. | 250/51.5 X |
| 3,394,255 | 7/1968 | Furnas | 250/51.5 |

OTHER REFERENCES

Coppola; J. Sci. Instrum.; Vol. 42, No. 11; 1965; p. 826

Primary Examiner—Anthony L. Birch
Attorney—Edwin E. Greigg

ABSTRACT: A crystal to be examined by X-rays is held on a goniometer head rotatable with the crystal about an axis ($\phi$-axis) passing through both the crystal and the goniometer head. The latter is mounted in a goniostat in such a manner that said $\phi$-axis, contained in the vertical plane of the goniostat, is transposable to at least two diametrically opposed (i.e., 180° apart) positions with respect to the inner race of the goniostat carrying the goniometer head.

3,631,240

APPARATUS FOR HOLDING AND ORIENTING A CRYSTAL IN X-RAY INSTRUMENTS MEASURING THE MICROSTRUCTURE THEREOF

BACKGROUND OF THE INVENTION

In monocrystal diffraction meters analyzing X-rays or neutron beams, it is known to use a goniostat for orienting the crystal-lattice planes parallel with the rotational axis of the diffraction meter. In such a goniostat usually two types of angular adjustments of the crystal may be made, each represented by an adjusting circle arranged perpendicularly with respect to one another. The vertical adjusting circle—also designated as the X-circle—may be designed either as an open or as a closed annular support. An open annular support (open goniostat has the advantage that that the goniostat and the counter tube are movable with respect to one another without encountering mechanical obstructions. Thereby it is achieved that the entire angular range of the goniostat may be scanned in a single setting and with the use of any desired four-circle drive. The open goniostat permits an angular displacement of the X-circle through only approximately 90°. In general, the extent of such an angular displacement is entirely sufficient since it permits the measurement of a hemispherical range of the reciprocal space. According to the Friedel theorem (relating to the coordinates of Bijvoet-pairs) such a measurement is sufficient for determining all the structural factors. Even in cases where, because of the presence of an anomalous scattering, measurement of data of the entire sphere in the reciprocal space is required, in each space group, except for the space group $P_1$ (asymmetrical triclinic system), at least one setting of the crystal may be found in which, because of symmetry reasons, the measurement of all independent structural factors of the reciprocal space is possible. In some cases, however, it is necessary to perform a measurement of the entire reciprocal space. Although it is always possible to perform a measurement of a nonoriented crystal, it might happen, however, that independent structural factors lie in that reciprocal space which may not be measured with an open Euler-balance.

To solve problems of the aforenoted type, either closed goniostats or open goniostats with crystal inverters are known to be used. In principle, with these apparatuses it is possible to measure all the data of the reciprocal space with a single crystal secured to the crystal holder in a desired manner. In practice, however, frequently difficulties appear since both the closed goniostats and the open ones operating with crystal inverters, shadow certain crystal reflexes. Although such shadows may be in most cases eliminated by means of appropriate readjustments at the monocrystal diffraction meter or at the crystal inverter, the measuring process is thereby made more complicated and may no longer progress in a fully automatic manner.

Further, it is known to use goniometer heads as holders for the monocrystals in X-ray apparatus that measure fine structures (such as X-ray cameras or monocrystal diffraction meters). The goniometer heads form one part of the goniostat and permit to swing the crystal through a greater or lesser angle in two mutually perpendicular directions and, at the same time, permit a simultaneous parallel displacement of the crystal in two directions. It is the purpose of these settings to orient the crystal in the eucentric point of the monocrystal diffraction meter incorporating a goniostat.

OBJECT AND SUMMARY OF THE INVENTION

It is an object of the invention to provide, in diffraction meters incorporating an open goniostat, an improved apparatus for permitting X-ray measurements of microstructures of an anomalously scattering monocrystal secured to a rotary goniometer head.

Briefly stated, the rotary axis of the goniometer head may be transposed into two positions which lie in the plane of the vertical circle of the goniostat and which are offset from one another by a predetermined angle, preferably 180°. The transposition of said rotary axis is, according to the invention, effected by a mechanism to which the goniometer head is affixed and which is mounted on, and displaceable with respect to, a conventional arcuate inner race of an open goniostat. The inner race, in turn, is movably held in a conventional arcuate outer race concentrically therewith. This apparatus permits to perform, with known diffraction meters incorporating open goniostats, a measuring process for the entire reciprocal space, similarly to a closed goniostat without assuming the aforedescribed disadvantages thereof.

In another embodiment of the invention, the goniometer head, with its base face, is mounted for pivotal movement about a rotational axis contained in a plane which extends parallel with said base face and which passes through the eucentric point.

The invention will be better understood and further objects as well as advantages will become more apparent from the ensuing detailed specification of several exemplary embodiments taken in conjunction with the drawing.

DESCRIPTION OF THE EMBODIMENTS

Figure 1A:
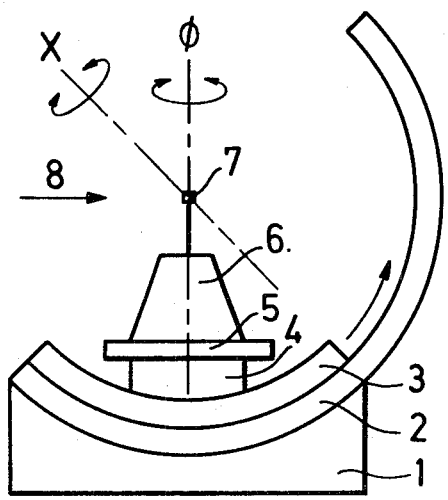
FIGS. 1a and 1b are schematic elevational views of a known goniometer head in two different (90° apart) operating positions.
Figure 1B:
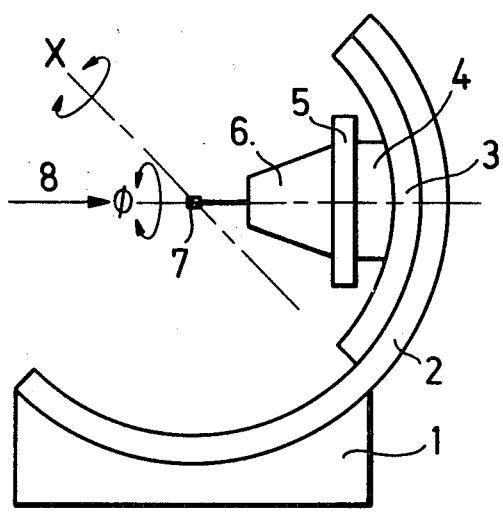

Turning now to FIGS. 1a and 1b, there is shown an open goniostat. To a base 1, which is secured to the θ-circle (not shown) of the diffraction meter and which may be adjusted in a four-circle drive through a predetermined additional angle with respect to the θ-position, there is secured the outer race 2 of an open ring support for the X-setting. The inner race 3 slides in the outer race 2 with the interposition of a ball guide or by means of a dovetail guide. To a holder 4 there is secured the Φ-circle which carries the goniometer head 6 with the small crystal 7. In automatic monocrystal diffraction meters these circles are set by means of motor drives (not shown in the figures) according to a given program.

The open goniostat permits a transposition of the X-circle through only about 90°. FIG. 1a shows one of the two settings and FIG. 1b shows the setting which is 90° offset with respect to the basic position. The X-ray (indicated by arrow 8) may directly impinge on the small crystal 7.

This open goniostat is redesigned by providing additional mechanical features so that the setting characteristics of a full goniostat may be obtained which has all the properties of a closed goniostat. Its particular advantage, however, is that the shadows caused by the goniostat itself are entirely eliminated. The only remaining shadow is a blocking of the primary or the reflected X-rays caused by the crystal holder (for example, the goniometer head). Such a blocking, however, is presupposed in principle and may not be eliminated from a diffraction meter by any structural modification whatever.

Turning now to FIGS. 2a–2d, there is shown an embodiment of the new goniostat according to the invention, in different settings of the goniometer head 6. Comparing this embodiment with the structure illustrated in FIG. 1, it is noted that the inner race 3' is formed as a circular arc of slightly more than 180° and may be moved to project beyond the outer race 2. On the inner race 3' there is mounted a carriage W which comprises a support 9 and a guiding mechanism, such as rollers 10, for engaging the inner race 3'. The rollers 10 should be designed in such a manner that the support 9 is guided in a circular path along the internal face of the inner race 3' and that the possibility of a lateral derailment or an overshooting of the ends of the inner race 3' is excluded. Such guiding means may be obtained by using additional lateral and counter rollers (not shown) so that the displacement of support 9 will be constrained to its prescribed circular path. It is an important feature of this structure that the carriage W may be immobilized securely and without play in two different positions spaced 180° from one another on said circular path.

Figure 2A:
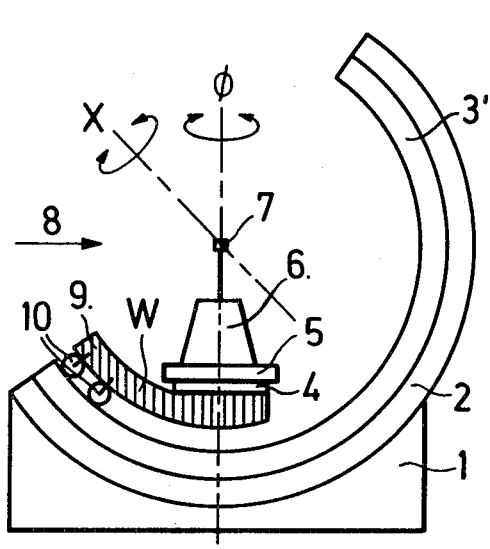
FIGS. 2a–2d are schematic elevational views of an embodiment of the invention in four different operating positions.
Figure 2C:
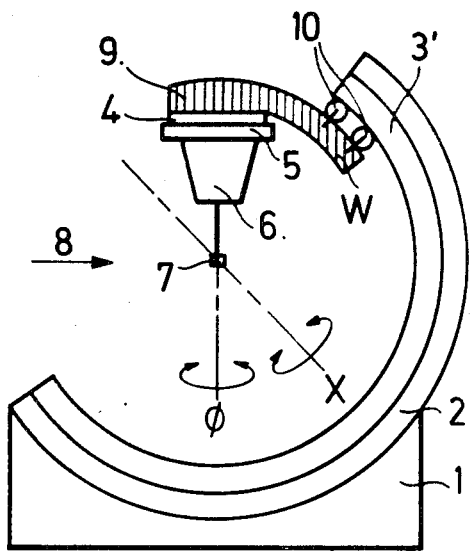

FIGS. 2a and 2c show two of these positions. It is not essential that the change itself from one position to the other be performed without play or with small mechanical tolerances. It is only required that the two positions should be adjusted with respect to one another in such a manner that the Φ-axis (the Euler angle Φ which is the angular displacement about the axis passing through the goniometer head 6) in both positions should be indentical, except for the 180° shift. This condition may be best fulfilled if the contacting faces of the carriage W in the two terminal positions are adjustable with respect to one another. The transposition of the carriage W from one position into another may be performed by means of a motor drive. In case of automatic monocrystal diffraction meters, the carriage may be guided by a Yes-No command. The structures for the motor drive, the securing means for immobilizing the carriage W in its aforedescribed positions, and the adjusting devices for these positions are not illustrated in the drawing.

Figure 2B:
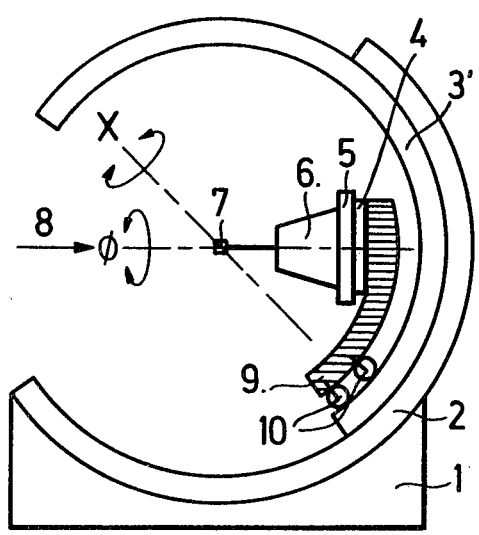
Figure 2D:
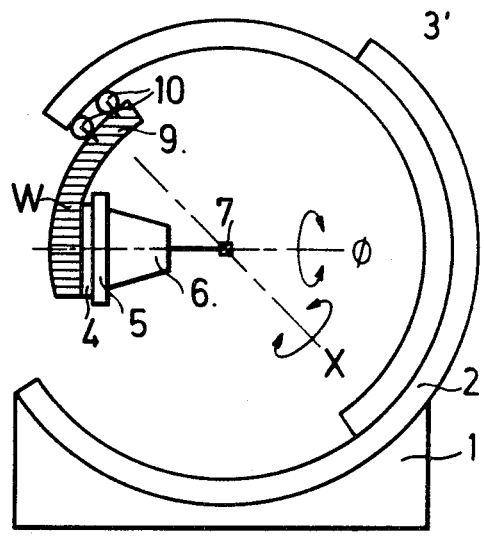

FIGS. 2a–2d show the various operational positions of the goniostat according to the invention. The operating position shown in FIG. 2a corresponds to that of the goniostat depicted in FIG. 1a. Similarly to the inner race 3 in FIGS. 1a and 1b, the inner race 3' is displaceable only through 90° with respect to the outer race 2. FIG. 2b shows the position of the goniostat after a transposition about an angle X=90° (X is the second Euler angle, which is the angular displacement about the axis of the inner and outer race 2, 3'). It is seen from FIGS. 2a and 2b that in both extreme positions, there are no mechanical obstructions in the path of the primary beam or the scattered beam of the X-ray (indicated with arrow 8). If, in accordance with FIG. 2c, the carriage W is brought into its opposite position, then even structural factors of those crystal lattice planes may be measured which may not be oriented for measurement in usual open goniostats. For measuring such planes, again a setting of the X-range between 0° and 90° is sufficient. The two extreme positions for this setting are shown in FIGS. 2c and 2d. It is seen that in the position according to FIG. 2c no shadowing takes place yet, whereas such an effect appears if the angle X, according to FIG. 2d, is approximately or exactly equal to 90°. This shadow effect, as already mentioned, cannot be avoided since the goniometer head 6 itself blocks the path of primary rays to, or scattered rays from, the crystal 7. The carriage 9, the support 1 for the Φ circle 4 and for the Φ circle 5 are arranged in such a manner that the shadowing effect caused by the goniometer head 6 is not increased.

Figure 3A:
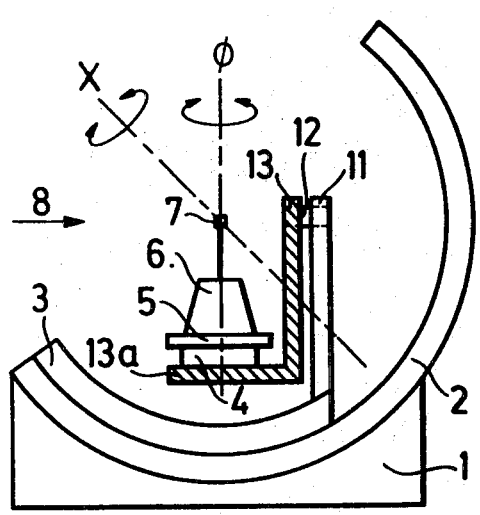
Figure 3C:
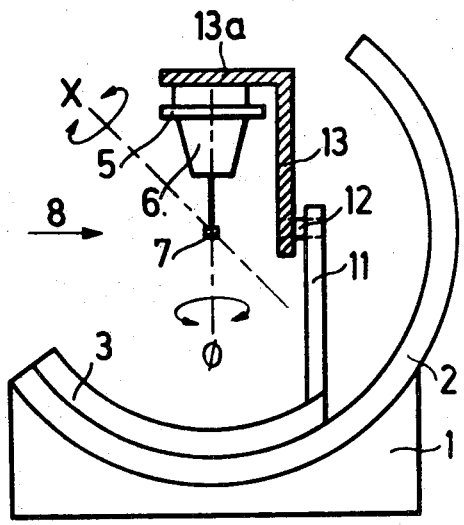
Figure 3B:
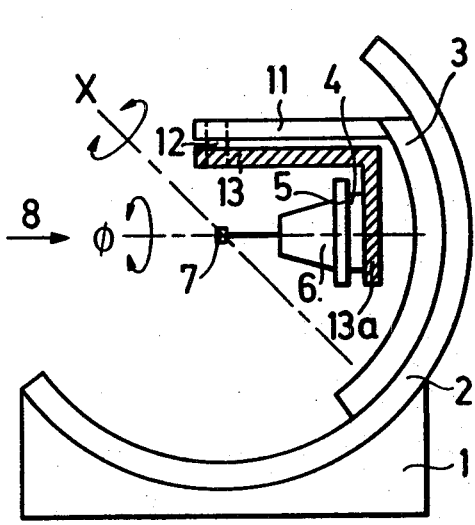
Figure 3D:
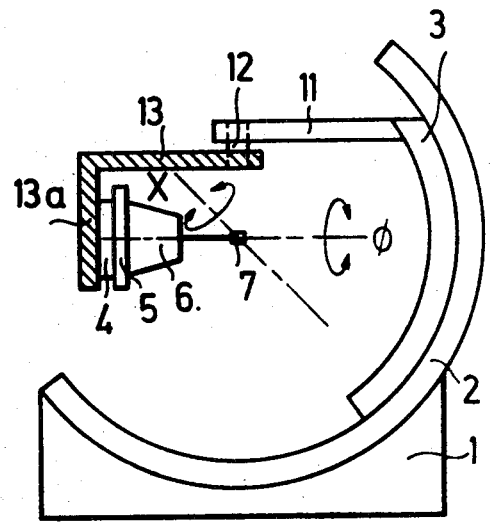

In FIGS. 3a–3d there is shown another embodiment of the goniostat according to the invention. It differs from the embodiment described in connection with FIGS. 2a–2d essentially in that at one end of the inner race 3, the length of which again corresponds to the length of the inner race 3 of FIG. 1a and 1b, there is secured a support 11 on which there is pivotally mounted, by means of a bearing 12, an L-shaped carrier 13 having a leg 13a extending parallel to the pivotal axis of support 13. To leg 13a there is secured the goniometer head 6 with its mounting means 4, 5, allowing a Φ rotation thereof. By virtue of the aforedescribed pivotal arrangement it is again possible to swing the Φ-axis—now in a plane perpendicular to the plane or races 2, 3—about 180° (FIG. 3c). Again, the only requirement is to properly adjust the two terminal positions (abutments or the like are used), whereas the behavior in the intermediate positions is of no significance. Driving means for the carrier 13 and details concerning the adjustment are not shown in FIGS. 3a–3d. In a sequence fully analogous to FIGS. 2a–2da, FIGS. 3a–3d show the Euler-balance in four operational positions, offset 90° with respect to one another. It is to be noted that the device may be set to all intermediate positions.

From a point of view of error theory the aforedescribed goniostats have advantages over the closed goniostats. While in the latter the range of error for the rotational X-axis is effective for the full angular range of 360°, the range of error—assuming identical tolerances in both supports—is substantially reduced for the motion of the support in one quadrant in the described embodiment. The error pertaining to the transposition of carrier 13 is independent of the transposition of the inner race 3 and may be reduced at will by adjustment.

While a goniostat according to FIGS. 2a–2d fully corresponds to a closed goniostat because of the coincidence of the axis of transpositional movement with the X-axis, the perpendicular arrangement of the transpositional axis (defined by the bearing 12) with respect to the X-axis (FIGS. 3X-axis, 3d) results in a changed procedure for adjusting the angle Φ. This modification, however, has no effect on the measurements. Further, goniostat structures may be designed in which the axis of transposition is oriented with respect to the X-axis in a desired manner.

Figure 4:
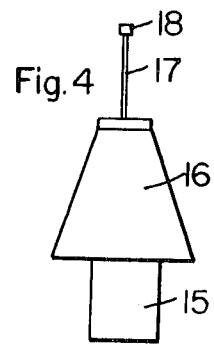
FIGS. 3a–3d are schematic elevational views of another embodiment of the invention in four different operating positions and FIG. 4 is a schematic elevational view of a conventional goniometer head.

In FIG. 4 there is schematically shown a conventional goniometer head. To s support 15 adapted to perform a Φ-rotation about the Euler-angle Φ, there is secured the goniometer head 16 proper which, in the usual design, comprises two arcuate slides arranged perpendicularly to one another and two mutually perpendicular, parallel slides. By means of these slides—none of which is shown—it is possible to orient a small crystal 18, secured to a support 17 (such as a thin glass stem), in an angular manner and align it with the rotational axis of the instrument (adjustment into the eucentric point).

That which is claimed is:

1. In an open goniostat for holding and orienting a crystal in X-ray instruments measuring the microstructure thereof, said open goniostat being of the known type that includes (a) a stationary outer race having an open, arcuate configuration, (b) a movable inner race displaceably held in said outer race concentrically therewith and having an open, arcuate configuration, (c) a goniometer head associated with said inner race and movable therewith as a unit and (d) means for rotating said goniometer head about a Φ-axis contained in the plane of the vertical circle of said goniostat and passing through said goniometer head and through said crystal supported thereby, the improvement comprising a support means secured to said inner race and carrying said goniometer head; said support means being movable relative to said inner race to assume at least a first position and a second position on and with respect to said inner race; said Φ-axis being transposed substantially 180° with respect to said inner race upon moving said support means from one of said positions into the other.

2. An improvement as defined in claim 1, wherein said support means includes a carriage on which said goniometer head is secured, said carriage being held on said inner race and being slidable therealong, said carriage being adapted to be immobilized in two positions 180° apart on said inner race.

3. An improvement as defined in claim 2, wherein at least said inner race has an arc of more than 180° and is displaceable into a position projecting beyond said outer race.

4. An improvement as defined in claim 1, wherein said support means includes a support rigidly affixed to said inner race, a holder pivotally secured to said support and having a leg extending parallel to the pivotal axis of said holder; said goniometer head being secured to said leg.

5. An improvement as defined in claim 4, wherein said holder may be swung in a plane being at a desired angle to the plane of said vertical circle and said holder is adapted to assume two positions spaced 180° apart.

6. An improvement as defined in claim 5, wherein said angle is 90°.

* * * * *